US008849745B2

(12) United States Patent
Campbell et al.

(10) Patent No.: US 8,849,745 B2
(45) Date of Patent: Sep. 30, 2014

(54) DECISION SUPPORT METHODS AND APPARATUS

(75) Inventors: Murray S. Campbell, Yorktown Heights, NY (US); Chung-Sheng Li, Scarsdale, NY (US); Jeanette M. Rosenthal, Pearl River, NY (US)

(73) Assignee: International Business Machines Corporation, Armonk, NY (US)

( * ) Notice: Subject to any disclaimer, the term of this patent is extended or adjusted under 35 U.S.C. 154(b) by 2430 days.

(21) Appl. No.: 11/318,364

(22) Filed: Dec. 23, 2005

(65) Prior Publication Data

US 2007/0150430 A1 Jun. 28, 2007

(51) Int. Cl.
*G06F 17/30* (2006.01)
*G06Q 10/06* (2012.01)

(52) U.S. Cl.
CPC ..................................... *G06Q 10/06* (2013.01)
USPC ............ 707/602; 707/756; 707/802; 707/809

(58) Field of Classification Search
USPC .......................................................... 707/101
See application file for complete search history.

(56) References Cited

U.S. PATENT DOCUMENTS

| | | | |
|---|---|---|---|
| 6,208,990 B1* | 3/2001 | Suresh et al. ........................ 1/1 | |
| 6,321,263 B1 | 11/2001 | Luzzi et al. | |
| 6,789,096 B2* | 9/2004 | Sankaran et al. ............. 707/203 | |
| 6,965,895 B2* | 11/2005 | Smith et al. ..................... 707/10 | |
| 7,181,743 B2* | 2/2007 | Werme et al. ................. 718/104 | |
| 2002/0077726 A1 | 6/2002 | Thorisson | |
| 2002/0129032 A1* | 9/2002 | Bakalash et al. .............. 707/101 |
| 2003/0123446 A1 | 7/2003 | Muirhead et al. |
| 2003/0144746 A1 | 7/2003 | Hsiung et al. |
| 2003/0191678 A1 | 10/2003 | Shetty et al. |
| 2004/0070606 A1 | 4/2004 | Yang et al. |
| 2004/0205110 A1* | 10/2004 | Hinshaw ....................... 709/201 |
| 2005/0154627 A1* | 7/2005 | Zuzek et al. .................... 705/10 |
| 2005/0278381 A1* | 12/2005 | Diao et al. ..................... 707/200 |
| 2007/0130231 A1* | 6/2007 | Brown et al. ................. 707/204 |

OTHER PUBLICATIONS

Author: Chuck Ballard, Roopa MS, Olaf Mueller, Zhi Yuan Pan, Andy Perkins, Pagadala J. Suresh; Title: Preparing for DB2 Near-Realtime Business Intelligence;Date: Mar. 2004;Publisher: IBM;Edition: First Edition;Pertinent pp. i-x, 11, 49, 64, 75, 85-87,173-176, 196, 215-218.*

Author: Vijayshankar Raman, Bhaskaran Raman, Joseph M. Hellerstein; Title: Online Dynamic Reordering for Interactive Data Processing; Date: 1999; Publisher: Very Large Data Base Endowment; Pertinent pp. 1-12 (re-numbered).*

* cited by examiner

*Primary Examiner* — Anh Tai Tran
(74) *Attorney, Agent, or Firm* — Anne V. Dougherty; Ryan, Mason & Lewis, LLP

(57) ABSTRACT

Improved decision support techniques are disclosed. For example, a technique for processing transactional data for use in accordance with a decision support operation comprises the following steps/operations. The transactional data is transformed into an interim form according to a relative importance of the transactional data to the decision support operation. The transformed data is incrementally analyzed, wherein the incremental analysis comprises applying a successive approximation to the data in the interim form, such that the decision support operation can be incrementally performed based on a transactional load. The technique may further comprise allocating one or more computing resources to incrementally perform the decision support operation.

20 Claims, 6 Drawing Sheets

DECISION SUPPORT METHODS AND APPARATUS

FIELD OF THE INVENTION

This present invention generally relates to decision support systems and, more particularly, to techniques for improving operations associated with decision support systems.

BACKGROUND OF THE INVENTION

Data and information management in a business or enterprise usually involves one or more transactional databases (also known as Operational Data Store or ODS) where business transactions are recorded, and decision support functionalities (in the business context, referred to as business intelligence or BI) use a separate instance of the database (including a data mart or a data warehouse). The database instance that provides decision support functionality is often logically separate from the transactional database due to the use of potentially different database schema such as star schema. In addition, the database instance that provides decision support functionality is also located in a physically separate server (or server cluster) to avoid interfering with the performance of the transactional (operational) server.

Running decision support functions on a physically separate decision support server does prevent impacting the performance of the operational server. A primary drawback of this solution is the additional expense to purchase, configure, and maintain a decision support server. In addition, there is also overhead involved in sending (or synchronizing) data from the operational server to the decision support server (which also involves ETL—extract, transform, and load operation). The separation between the operational server (or ODS) from the decision support server also prevents real-time decision support (also referred to as operational decision support). This is often required, for example, in product recommendation in e-commerce where the decision support needs to occur within a few user clicks on a web site.

Recently, there is substantial interest in server consolidation in which multiple logical instances of the server are running on the same physical server (or server cluster). This often involves the use of a virtualization layer to enable the mapping of multiple logical servers onto the same physical server either statically or dynamically. As an example, IBM Corporation (Armonk, N.Y.) provides a Hypervisor™ product that enables the partitioning through DLPAR (dynamic logical partitioning) of an IBM pSeries or iSeries server into multiple logical server partitions with each partition having its own processors, memory, and I/O adapter cards. Hewlett Packard (Palo Alto, Calif.) Integrity servers provide similar partition capability through logical (vPar) and physical (nPar) partitioning.

There are a number of commercially available load balancing engines, such as the IBM Tivoli Intelligent Orchestrator™ (TIO), that enable provisioning and scheduling capability to ensure the quality of service (QOS) of each computing task is achieved.

Running decision support (or business intelligence) operations on the same server that also runs the transactional server may interfere and slow down the transactional server on normal operational tasks. This is due to the sharing of central processing units (CPUs) and virtual memory as well as the access to databases. Load balancing on shared CPUs can be achieved through, for example, IBM Tivoli Intelligent Orchestrator™.

Interference due to simultaneous access to the same database instance, however, can only be eliminated through the careful partitioning of the database tables and more intelligent scheduling of the decision support related tasks. A known approach to address this problem is to schedule computation-intensive tasks and data-intensive tasks at previously known periods of low system load (e.g., in the middle of the night). The drawback of this approach is that the decision support analysis is not real-time and does not take into account the data that has arrived since the last time the decision support processing was run. If a significant change has taken place in the characteristics of the decision support data, there will be a delay until this change is reflected in the decision support analysis. In the intervening time, poor decisions (e.g., business decisions) could be made.

U.S. Patent Application No. 2004/0070606 A1, published Apr. 15, 2004, discloses a methodology for preprocessing market data and capturing the preprocessed data as association rules through the association rule analysis. The post-processing will involve the application of predetermined criteria to extract really useful rules. The method disclosed extracts rules in batch during the preprocessing stage and does not reflect the market situations in real time until the market data is processed again.

U.S. Patent Application No. 2003/0191678 A1, published Oct. 9, 2003, discloses a method that consists of a data management system, an assignment system, and a disruption handling system to facilitate dynamic changing of the data while solving a solution. In particular, the method disclosed translates domain specific data into application specific data, and stores preprocessed data in conjunction with the real time data for decision making. However, decision making operations are done in batch.

U.S. Patent Application No. 2003/0144746 A1, published Jul. 31, 2003, discloses a method that preprocesses raw data, communicates it to the process manager, which in turn may access processes to analyze and characterize the data received.

U.S. Patent Application No. 2003/0123446 A1, published Jul. 3, 2003, discloses a method that preprocesses the data locally before sending to a centralized location. The intent of the method is to minimize communication bandwidth needed for transmitting data to a centralized location.

U.S. Patent Application No. 2002/0077726 A1, published Jun. 20, 2002, discloses a method that includes an input processor time stamping the input data, forwarding to a preprocessor for preprocessing, then storing in a raw data buffer. Additional load balancing measure based on the pre-assigned priority is also disclosed. The method addresses decomposition of newly arrived transactions into a set of smaller decisions and the potential consideration for load balancing.

U.S. Pat. No. 6,321,263 B1, issued Nov. 20, 2001, discloses a method that preprocesses raw data and stores it in a table before being provided to a central repository. At predefined intervals, the data in the raw data tables is accessed and the information is processed to generate the defined sets of statistical data which is then inserted into statistics tables.

Accordingly, improved decision support techniques are needed.

SUMMARY OF THE INVENTION

Principles of the invention provide improved decision support techniques.

In one aspect of the invention, a technique for processing transactional data for use in accordance with a decision support operation comprises the following steps/operations. The transactional data is transformed into an interim form according to a relative importance of the transactional data to the decision support operation. The transformed data is incrementally analyzed, wherein the incremental analysis comprises applying a successive approximation to the data in the interim form, such that the decision support operation can be incrementally performed based on a transactional load.

The technique may further comprise allocating one or more computing resources to incrementally perform the decision support operation. The computing resource allocation may be determined based on a quality of service criterion associated with the decision support operation. The computing resource allocation may also be determined based on a quality of service criterion associated with the transactional data.

The transactional data transforming step/operation may further comprise transforming the data into a multi-resolution representation, wherein the representation indicates a primary aspect of the data and at least a secondary aspect of the data. Further, the incremental analysis step/operation may further comprise incrementally updating a decision support model. The decision support model may be incrementally updated using the incremental analysis based on successive approximation applied to the interim form of the transactional data starting with a most important aspect of the data and following through to one or more less important aspects of the data. Still further, an amount of analysis of the interim form of the transactional data may be increased when an availability of computing resources increases.

Advantageously, in accordance with illustrative embodiments, principles of the invention allow decision support (e.g., business intelligence) operations such as data mining to take place on an operational server while ensuring that the analysis is performed as near to real-time as possible, with minimal impact on the operational performance, and thus eliminating the need for a separate server dedicated to decision support operations. Illustrative steps of an embodiment of the invention comprise incremental decision support analysis, progressive load balancing so that decision support processing is performed to the extent that does not affect the quality of service of operational performance, and processing of data into an interim form for subsequent decision support processing.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
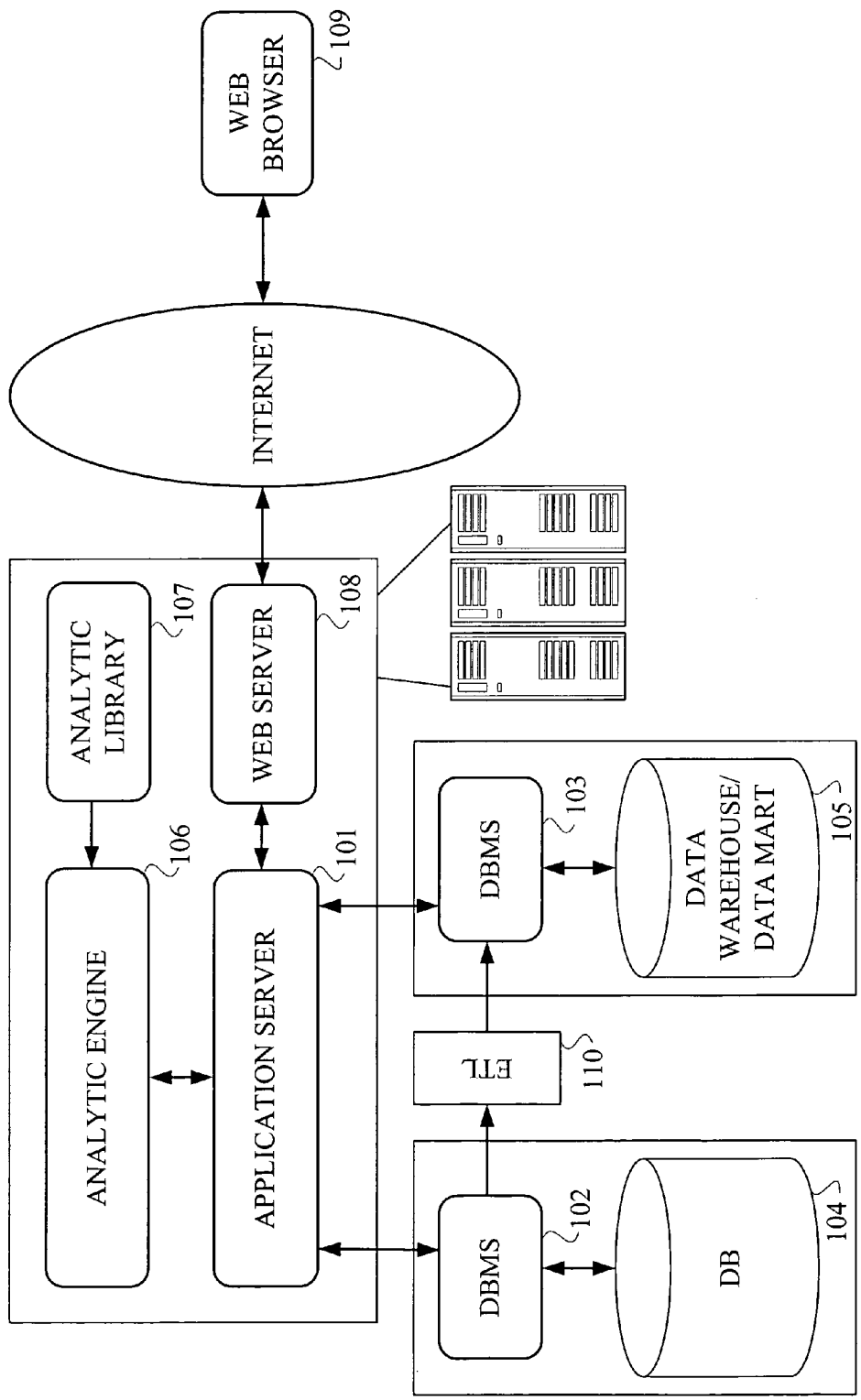
FIG. 1 illustrates a computing infrastructure for a decision support system, according to an embodiment of the present invention.

While illustrative embodiments of the invention will be described below in the context of electronic commerce (e-commerce) applications and particular server architectures, it is to be understood that principles of the invention are not limited to a particular type of application or processing architecture. Rather, principles of the invention are applicable to any type of application or processing architecture in which it would be desirable to provide improved decision support techniques. Also, while illustrative embodiments of the invention will be described below in the context of so-called "business intelligence" operations, it is to be understood that principles of the invention are not limited to such business related operations, but rather are applicable to any type of decision support environment.

Thus, as will be described in detail herein, illustrative embodiments of the invention provide decision support systems that allow organizations to aggregate, synthesize, analyze and integrate data for the purpose of facilitating improved business decisions. Such an illustrative business intelligence (BI) system comprises: data ingestion, transformation, cleansing, storage, retrieval, and processing to produce output that provides insight or value (BI analysis). More specifically, the invention addresses the issue of performing real-time or near real-time business intelligence with streaming messages/data such as transactions.

By way of example, a methodology that enables simultaneous processing of business transactions and business intelligence/decision support operation within a logical partition of computing facilities may use a combination of the following steps:

(1) Extract metadata or apply transformation to derive interim data which captures aspects out of incoming transactional and/or data stream according to its relative importance to the subsequent BI processing. For example, the transformation can use a multi-resolution approach, also referred to as a progressive representation approach, to represent an image and indicate the most important aspect, secondary aspect, tertiary aspect, and so on. Multi-resolution approach is applicable in general to most one-dimensional (1D), two-dimensional (2D), and multi-dimensional data including data cubes built out of data warehouses.

(2) Incremental update of BI models, by using incremental analysis based on successive approximation applied to the extracted metadata and/or interim form of data, starting with the most important aspect and following through to less important aspects. This step ensures that the BI model will be asymptotically approaching the new state if sufficient time is allowed. This step enables incremental analysis—any transaction can be suspended at any time, while generating real usable results. In this illustrative embodiment of the invention, we apply both successive approximation in terms of analysis, and successive approximation of the data, so that an approximation of an operation on the approximation of the data will yield incremental refinement of the results.

(3) Resource allocation of computing for transactional and BI related processing based on the preset policy. This enables the set up of either "quality of service" for transactional processing, or "quality of service" for BI processing. Once the "quality of service" (e.g., latency) for one of them is set up (such as for transactions), the additional computing resource will be used to attain as much progress as possible for the other. The reverse is also true—the QOS for BI (e.g., accuracy) can be used to decide on the amount of successive approximation and the level of data resolution. This step also enables the connection to utility computing and/or grid computing. The capacity within utility computing can be determined when QOS for both transaction and BI are prescribed. In a transparent-BI mode, BI related operations will only be conducted when the transactional load of a system falls below a certain threshold.

It is to be understood that more stages of successive approximation of the incremental analysis, on more aspects of the data are permitted when additional computational capacity is available.

FIG. 1 illustrates a computing infrastructure for business intelligence operations, according to an embodiment of the invention. As shown, the infrastructure comprises a transactional database, which includes database management system (DBMS 102) and database instance(s) (DB 104). The infrastructure also comprises a data warehouse/data mart, which includes DBMS (103) and the data warehouse/data mart instance(s) (105). Note that a data warehouse and a data mart are usually logically separate from the transactional database. The infrastructure also comprises an Extract-Transform-Load module (ETL 110), which provides the capability to extract data out of the transactional database, perform necessary data transformation and load into the data warehouse or data mart.

The infrastructure also comprises application server (101), such as JBOSS™ application server, IBM WebSphere™ Application Server or BEA Weblogic™ for executing applications (such as the analytic engine 106). Also, as shown, the infrastructure comprises the actual web server(s) 108 that are accessed by a web browser 109 via the Internet.

Further, the infrastructure comprises analytic engine 106, which provides capability to execute sophisticated data analysis primitives including statistical analysis such as clustering and classification operations.

Still further, the infrastructure comprises analytic library 107, which provides a set of statistical and other analytical operation software modules that can be invoked and executed by the analytic engine.

Note that the transactional server is usually physically separate from the server that houses the data warehouse and data mart. The application server that runs the analytic engine sometimes is located in a separate physical server from the servers that run the transactional database or the data warehouse/data mart. The application server and the application can often be provisioned on one or more servers or server partitions depending on the requirements of the computational load.

Figure 2:
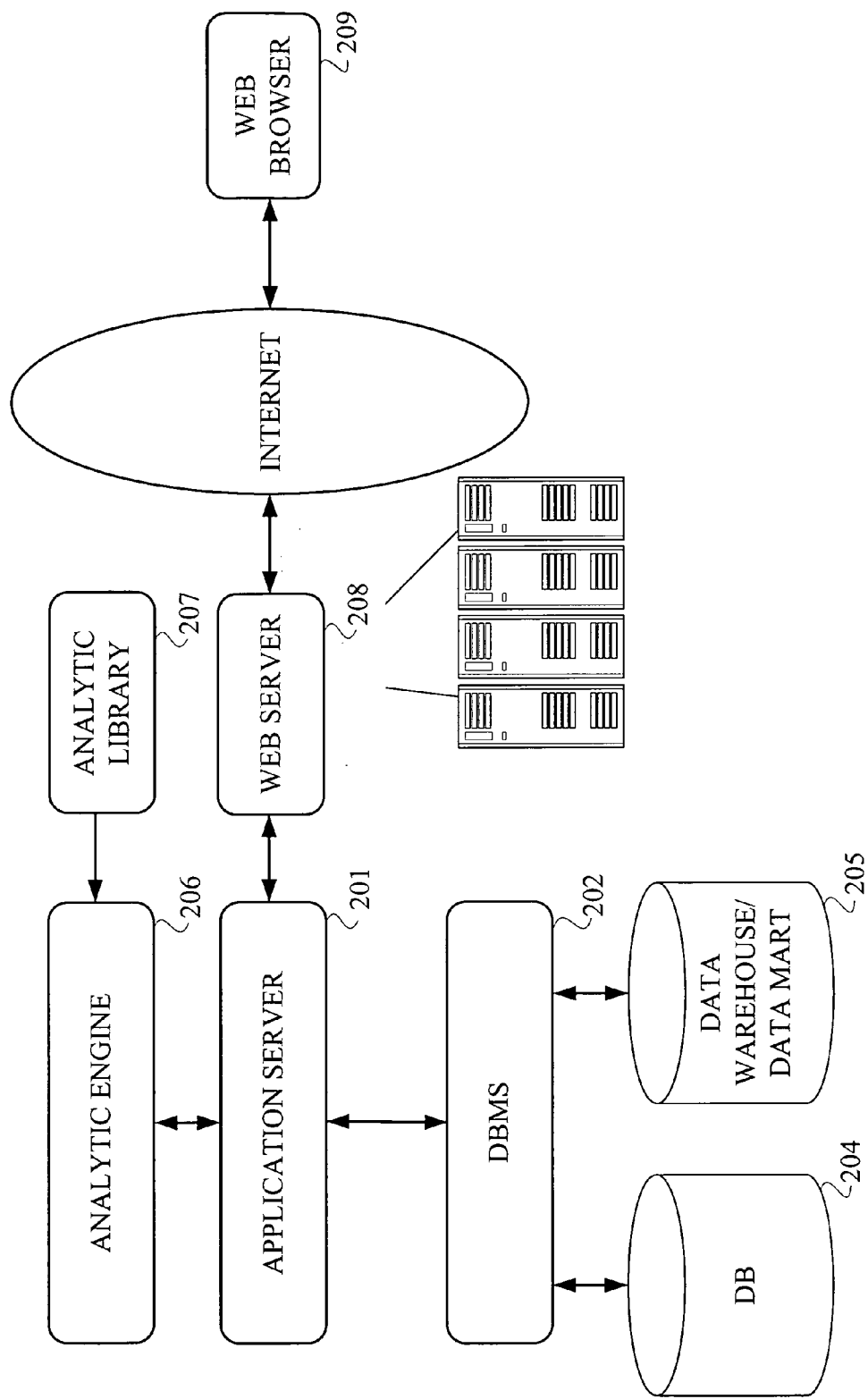
FIG. 2 illustrates a computing infrastructure for a decision support system, according to another embodiment of the present invention.

FIG. 2 illustrates a decision support system and its corresponding environment, according to an embodiment of the present invention. More particularly, FIG. 2 shows a computing infrastructure in which the DBMS, data warehouse, application server and analytic engine are all co-located and can be provisioned simultaneously and incrementally without the constraint that the DBMS, data warehouse, and application server have to be provisioned to physically separate servers. It is to be appreciated that the term "co-located" means that all of these components (e.g., application server, HTTP server, analytic engine, etc.) are located on the same server. In this case, new computing resources can grow more incrementally and scale with an increase of computational load.

As shown, the infrastructure comprises a transactional database, which includes database management system (DBMS 202) and database instance(s) (DB 204). The infrastructure also comprises a data warehouse/data mart instance(s) (205), which is also managed by DBMS 202.

The infrastructure also comprises application server 201 and the actual web server(s) 208 that are accessed by a web browser 209 via the Internet. Further, the infrastructure comprises analytic engine 206.

It is to be understood that, while the components in the shaded box in FIG. 2 are co-located, they may generally have similar functions as similarly named components described above in the context of FIG. 1.

Figure 3:
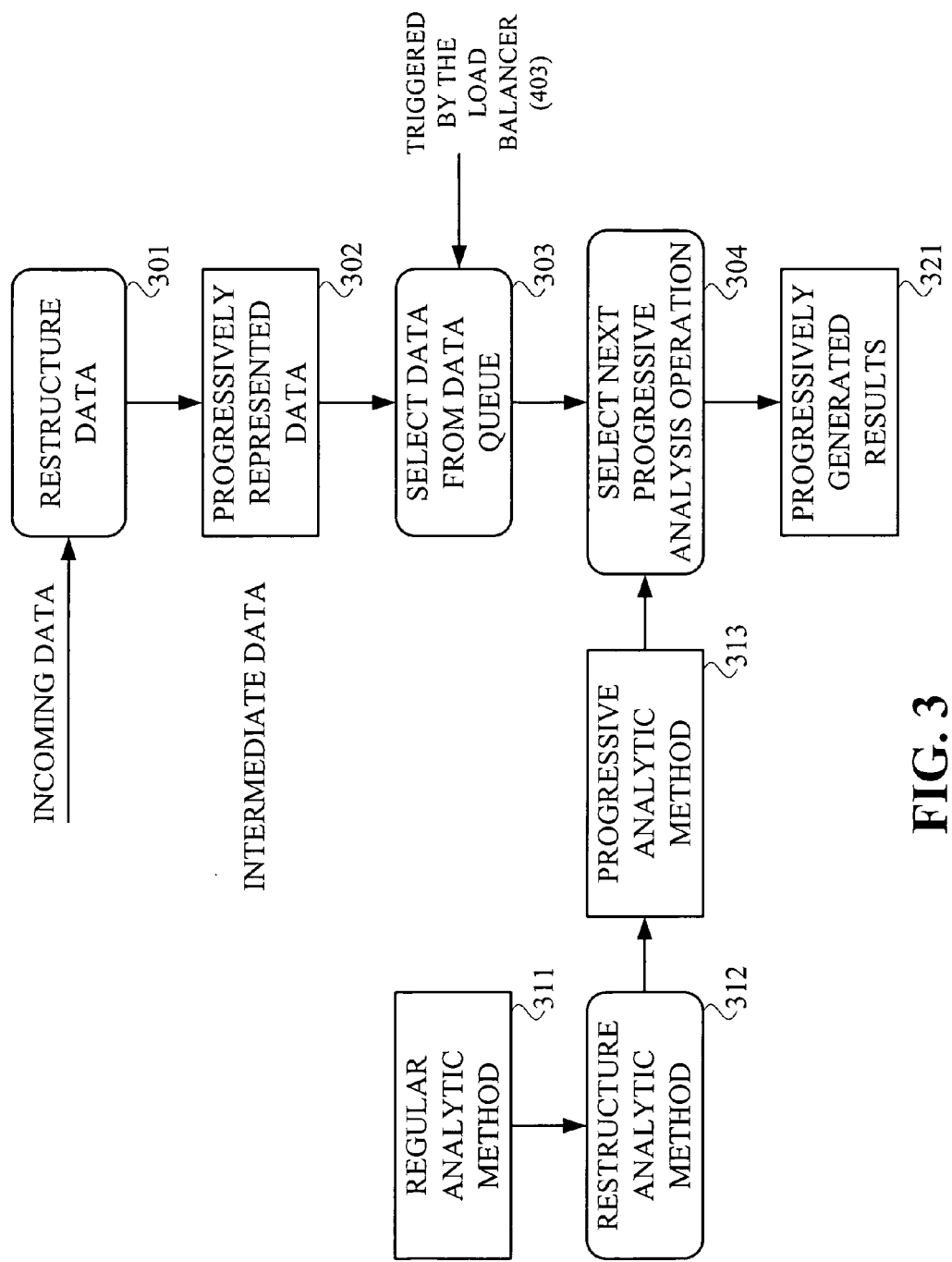
FIG. 3 illustrates a methodology for incremental processing of streaming data in a decision support system, according to an embodiment of the present invention.

FIG. 3 illustrates a methodology for incremental processing of streaming data in a decision support system, according to an embodiment of the present invention. That is, in the context of a business related environment, FIG. 3 shows the basic principle for ensuring incremental business intelligence operations.

Incoming data is restructured (301) so that the data is represented progressively (302). As an example, assume the incoming data stream includes the following time series:

$$5,10,13,11,15,17,$$

One possible way of a $1^{st}$ level progressively represented time series appears below:

$$7.5,5,12,-2,16,2,$$

This new format of the time series computes the average (in italics) and the difference for each pair of data. This new representation is lossless with respect to the original time series as the original time series can be reconstructed from the new time series. Additional levels can be generated by applying the same methodology recursively. Progressively represented data allows analytic operations to be performed to produce approximate results. The results can be refined as additional analytic operations are performed.

Similarly, analytic operations (311) can be restructured (312) to perform progressively (313). As an example, it is well known that the analytic function $f(x)$ at a point $x=c$ can be decomposed through the Taylor series expansion method:

$$f(x)=f(c)+f'(c)(x-c)+f''(c)/2(x-c)^2+$$

Consequently, computing the value of $f(c')$ where $c'$ is close to $c$ can be successively approximated by using the additional terms in the Taylor series. Progressive analytic results can thus be obtained through combining approaches for progressively represented data and progressively decomposed analytic operations. During each computing cycle, a data element is selected from the progressively represented data (303) to be processed by the next analytic operation (304). As long as there are unused cycles, the results (321) can be progressively refined as additional operations are performed on additional data.

With reference back to FIG. 2, it is to be appreciated that the run time steps of FIG. 3 (e.g., steps 301 through 304) may be performed in analytic engine 206. Steps 311 and 312 are off-line restructuring of the algorithm. Furthermore, it is to be appreciated that the decision support (or BI) model, referred to herein, is part of the progressive analytic method 313.

Figure 4:
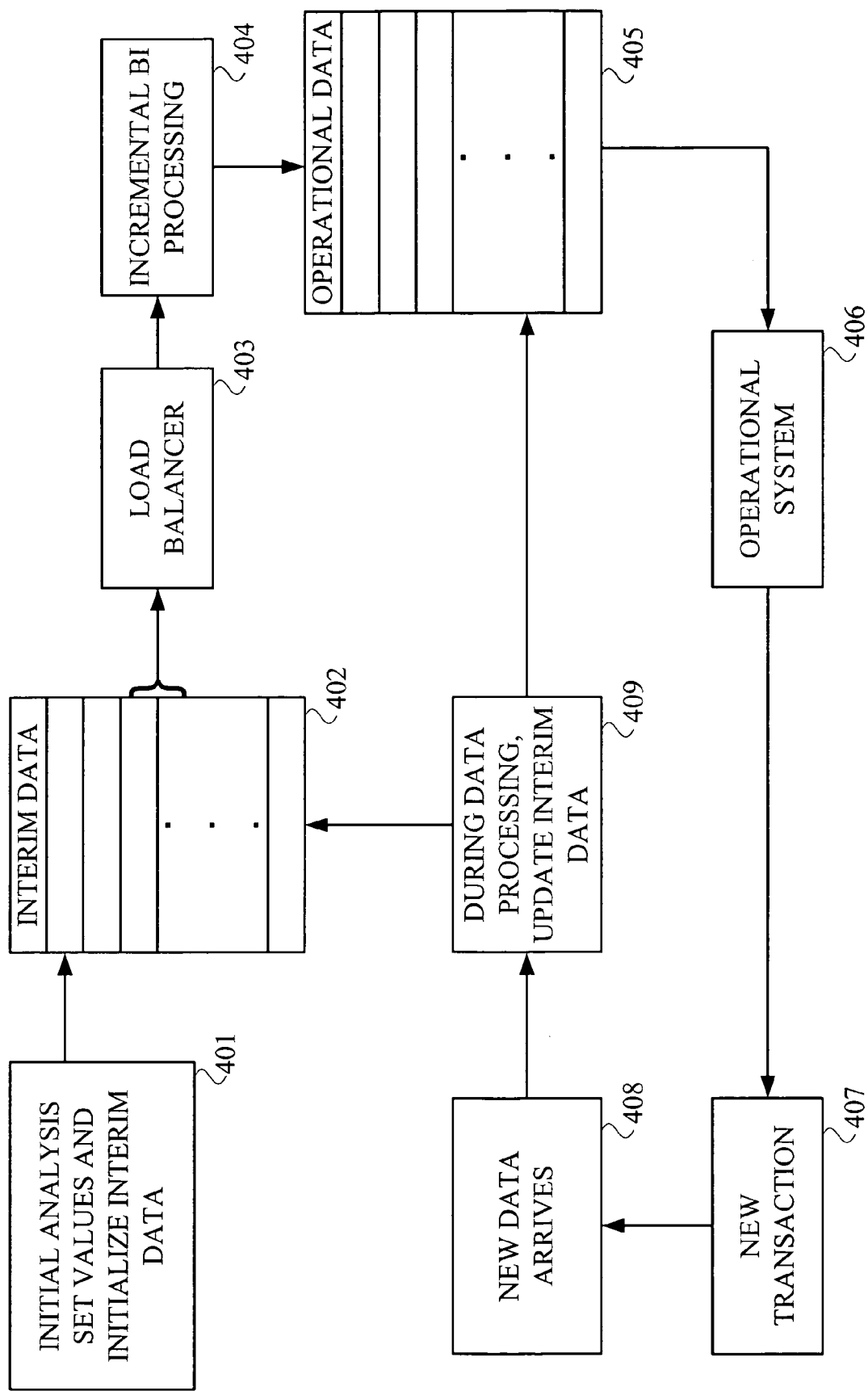
FIG. 4 illustrates a methodology for incremental processing of incoming data into intermediate format and producing an updated version of the decision support data, according to an embodiment of the present invention.

FIG. 4 illustrates a methodology for incremental processing of incoming data into intermediate format and producing an updated version of the decision support data, according to an embodiment of the present invention. More particularly, FIG. 4 shows an end-to-end scenario of the illustrative embodiment of the invention.

The operational system (406) generates a new transaction (407). The operational system refers to the component that performs the operational or transactional functions (as opposed to the component that performs the decision support or BI functions). Data associated with this transaction (408) is processed into an interim form (409), such as into a progressive representation as explained above, and saved in the interim data table (402). Whenever system load conditions permit, the load balancer (403) moves a subset of the interim data to the incremental BI processing component (404). This component updates the BI analysis with the new data and saves it in the operational data table (405). Since the system utilization is low, the operational data can be updated without having a detrimental impact on the overall performance of the system. It is to be understood that table 402 is used for saving interim data, while data table 405 represents the Operational Data Store or ODS.

With reference again to FIG. 2, steps/blocks 401, 402, 404, 409 of FIG. 4 may be performed in analytic engine 206, while steps/blocks 405 and 407 may be performed in database 204.

Principles of the invention integrate analysis with techniques to monitor, adapt/adjust, predict, and execute evaluation. They provide an advantageous way to process transactions immediately as they are made and perform system load balancing to determine which operation to perform so as not to affect the performance of the overall system. Business intelligence is broken up into fine granular steps to enhance performance.

The incremental data mining breaks apart the analysis process into smaller pieces. This involves the following steps: (1) reconfigure the analysis algorithm so that the algorithm can process the data incrementally; (2) decompose the analysis algorithm so that the analysis process can be done progressively starting from coarse to fine if time permits; (3) restructure the data so that the data can also be computed by the analysis algorithm from coarse to fine. The load balancing significantly minimizes the effect on the overall system. One of the key benefits is the consideration of transactions as they occur. As each transaction is processed, the interim data table(s) is updated with interim results so that it is not necessary to fully analyze the individual transactions when performing analysis. By aggregating the transaction data into interim table(s), data mining is effectively reduced to smaller increments.

For example, if this technique were to be applied in the area of electronic commerce to analyze product purchases, we might have an analysis flow as follows. The operational server would be the e-commerce server that runs the web store. A new transaction would be a new order placed by an online customer. The interim data would be updated by incrementing the counts of each product sold in the new order, as well as the counts of each pair (if any) of products that appears in the new order. When system utilization is low (e.g., there are only a few customers on the website), a small number of rows are processed. The rows can be chosen based on store, product family, product category, etc. The processing can update the scores for identifying products likely to be sold together, which the operational server can use to make recommendations to future customers.

Figure 5:
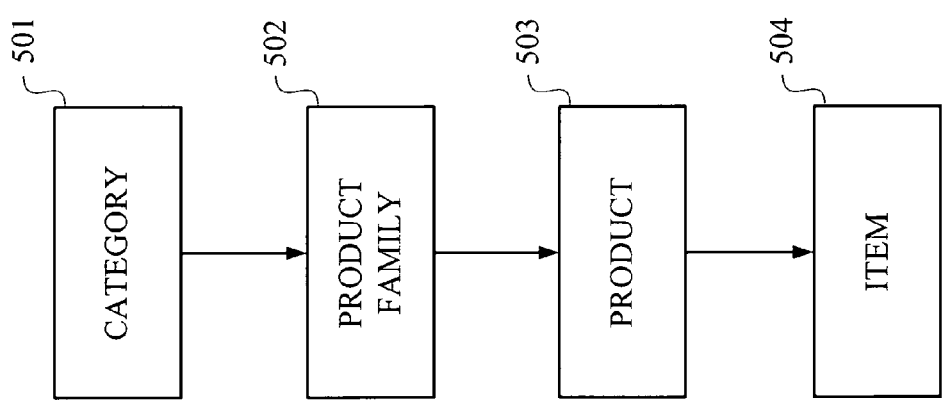
FIG. 5 illustrates a data model associated with an electronic commerce example, according to an embodiment of the present invention.

Using this technique makes the analysis more efficient and closer to real-time. If the analysis to be performed is associations, the interim data tables could be:

1. SKU, Count, UpdTimeStamp
2. SKU1, SKU2, PairCount, UpdTimeStamp
3. StoreID, TotalTransactionCount When a new transaction arrives, in addition to the usual processing, the counters are incremented and the last update time stamp is updated in the interim data tables. When system utilization is low, the load balancer utilizes a progressive algorithm to select which rows to process. For example, the catalog hierarchy for a store can be as shown in FIG. 5.

The load balancer can select the rows at the highest level in the hierarchy (category 501) since the last update time. As time permits, the load balancer can gradually work its way down to the lowest level (item 504).

Prior to making a recommendation, the hierarchy of scores is taken into consideration when determining the strongest associations. When approximating the score, the scores at the level with the most recent update timestamp and the levels below need only be considered. For example, if product (503) has the most recent update timestamp, the scores at the category (501) and product family (502) levels need not be considered. The product score and the item score are used to approximate the recommendations.

During times of lower system utilization, there will be greater precision because processing will complete at all levels in the hierarchy. During times of higher system utilization, there will be less precision because processing may only complete for the top most levels in the hierarchy.

Figure 6:
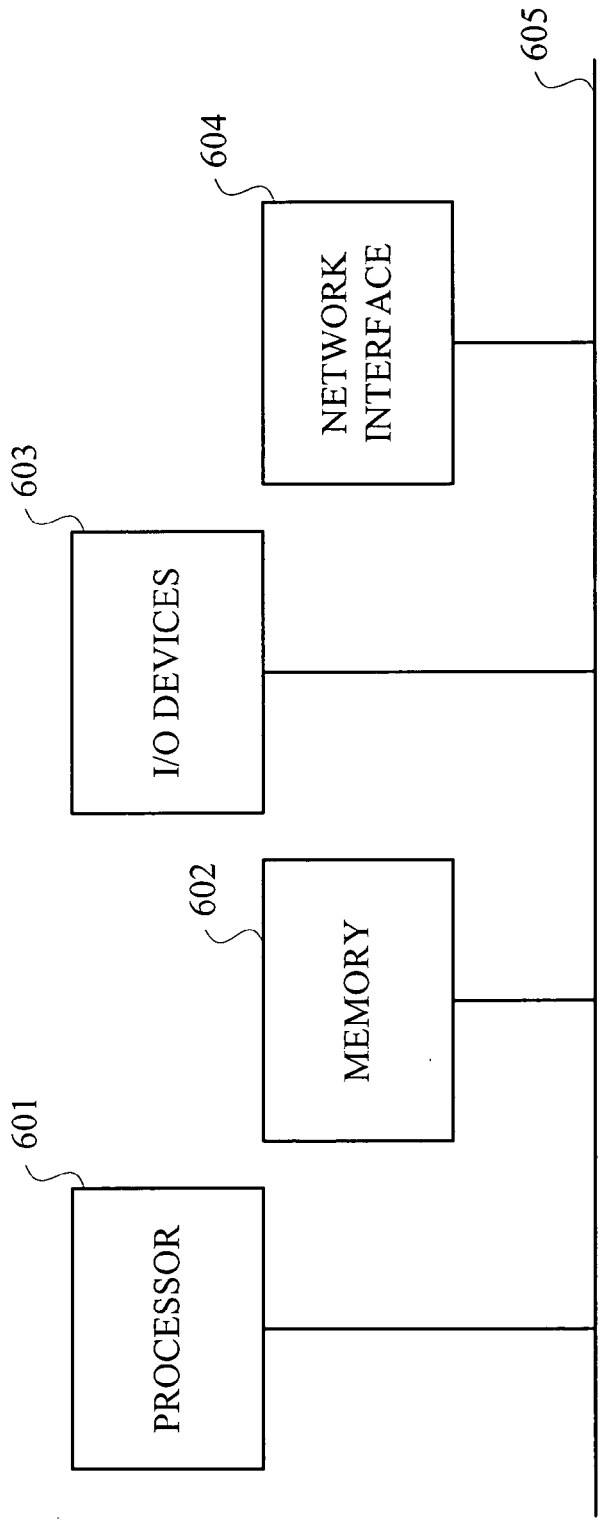
FIG. 6 illustrates a computing system in accordance with which one or more components/steps of decision support techniques may be implemented, according to an embodiment of the present invention.

FIG. 6 illustrates a computing system in accordance with which one or more components/steps of decision support techniques (e.g., components and methodologies described in the context of FIGS. 1 through 5) may be implemented, according to an embodiment of the present invention. It is to be understood that the individual components/steps may be implemented on one such computing system or on more than one such computing system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computing system shown in FIG. 6 may represent one or more servers or one or more other processing devices capable of providing all or portions of the functions described herein, e.g., DBMS, database, data warehouse/data mart, ETL, application server, web server, analytic engine, analytic library, web browser, load balancer, data table, etc.

As shown, the computing system architecture may comprise a processor 601, a memory 602, I/O devices 603, and a communication interface 604, coupled via a computer bus 605 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing transactional data for use in accordance with a decision support operation, comprising the steps of:
    transforming the transactional data into an interim form according to a relative importance of the transactional data to the decision support operation; and
    incrementally analyzing the transformed transactional data, wherein the step of incremental analyzing comprises applying a successive approximation to the transactional data in the interim form, wherein the decision support operation is incrementally performed based on a transactional load;
    wherein the transforming and incremental analyzing steps are executed on a computing system comprising a processor and a memory, wherein one or more software components for implementing the transforming and incremental analyzing steps are loaded from the memory and executed by the processor.

2. The method of claim 1, further comprising the step of allocating one or more computing resources to incrementally perform the decision support operation.

3. The method of claim 2, wherein the computing resource allocation is determined based on a quality of service criterion associated with the decision support operation.

4. The method of claim 2, wherein the computing resource allocation is determined based on a quality of service criterion associated with the transactional data.

5. The method of claim 1, wherein the transactional data transforming step further comprises transforming the data into a multi-resolution representation, wherein the representation indicates a primary aspect of the data and at least a secondary aspect of the data.

6. The method of claim 1, wherein the incremental analysis step further comprises incrementally updating a decision support model.

7. The method of claim 6, wherein the decision support model is incrementally updated using the incremental analysis based on successive approximation applied to the interim form of the transactional data starting with a most important aspect of the data and following through to one or more less important aspects of the data.

8. The method of claim 1, wherein an amount of analysis of the interim form of the transactional data is increased when an availability of computing resources increases.

9. Apparatus for processing transactional data for use in accordance with a decision support operation, comprising:
    a memory; and
    at least one processor coupled to the memory and operative to: (i) transform the transactional data into an interim form according to a relative importance of the transactional data to the decision support operation; and (ii) incrementally analyze the transformed transactional data, wherein the step of incremental analyzing comprises applying a successive approximation to the transactional data in the interim form, wherein the decision support operation is incrementally performed based on a transactional load.

10. The apparatus of claim 9, wherein the at least one processor is further operative to allocate one or more computing resources to incrementally perform the decision support operation.

11. The apparatus of claim 10, wherein the computing resource allocation is determined based on a quality of service criterion associated with the decision support operation.

12. The apparatus of claim 10, wherein the computing resource allocation is determined based on a quality of service criterion associated with the transactional data.

13. The apparatus of claim 9, wherein the transactional data transforming operation further comprises transforming the data into a multi-resolution representation, wherein the representation indicates a primary aspect of the data and at least a secondary aspect of the data.

14. The apparatus of claim 9, wherein the incremental analysis operation further comprises incrementally updating a decision support model.

15. The apparatus of claim 14, wherein the decision support model is incrementally updated using the incremental analysis based on successive approximation applied to the interim form of the transactional data starting with a most important aspect of the data and following through to one or more less important aspects of the data.

16. The apparatus of claim 9, wherein an amount of analysis of the interim form of the transactional data is increased when an availability of computing resources increases.

17. An article of manufacture for processing transactional data for use in accordance with a decision support operation, comprising a computer readable storage medium containing one or more programs which when executed by a processor implement the steps of:
    transforming the transactional data into an interim form according to a relative importance of the transactional data to the decision support operation; and
    incrementally analyzing the transformed transactional data, wherein the step of incremental analyzing comprises applying a successive approximation to the transactional data in the interim form, wherein the decision support operation is incrementally performed based on a transactional load.

18. The method of claim 1, wherein the transforming step comprises generating one or more items within the interim form representative of one or more items within the transactional data, at least one of the one or more items within the interim form having a value different from at least one of the one or more items within the transactional data.

19. The apparatus of claim 9, wherein the transforming operation comprises generating one or more items within the interim form representative of one or more items within the transactional data, at least one of the one or more items within the interim form having a value different from at least one of the one or more items within the transactional data.

20. The article of manufacture of claim 17, wherein the transforming step comprises generating one or more items within the interim form representative of one or more items within the transactional data, at least one of the one or more items within the interim form having a value different from at least one of the one or more items within the transactional data.

\* \* \* \* \*